United States Patent [19]

Fought et al.

[11] Patent Number: 4,887,830

[45] Date of Patent: Dec. 19, 1989

[54] WHEELCHAIR WITH COMBINED WHEEL LOCK AND HILL HOLDER

[75] Inventors: Gerald E. Fought, Avon; Raymond J. Herrmann, Westlake, both of Ohio

[73] Assignee: Invacare Corporation, Elyria, Ohio

[21] Appl. No.: 174,825

[22] Filed: Mar. 29, 1988

[51] Int. Cl.$^4$ ............................................. B60T 1/04
[52] U.S. Cl. .............................. 280/304.1; 280/250.1; 188/2 F; 297/DIG. 4
[58] Field of Search ............... 280/242 WC, 289 WC; 297/DIG. 4; 188/30, 2 F, 82.2, 82.3, 82.4, 82.7

[56] References Cited

U.S. PATENT DOCUMENTS

| | | |
|---|---|---|
| 545,492 | 9/1895 | Hall . |
| 1,306,766 | 6/1919 | Kuuper . |
| 1,760,207 | 5/1930 | Parsons . |
| 1,940,100 | 12/1933 | Ragsdale . |
| 2,162,188 | 6/1939 | Willett . |
| 2,221,190 | 11/1940 | Hunter . |
| 2,438,154 | 3/1948 | Dickens . |
| 2,518,642 | 8/1950 | Schneider . |
| 2,667,945 | 2/1954 | Caldeira . |
| 2,727,603 | 12/1955 | Rauen . |
| 3,017,964 | 1/1962 | Thuengen . |
| 3,226,129 | 12/1965 | McKinley . |
| 3,259,396 | 7/1966 | Zamotin . |
| 3,529,700 | 9/1970 | Marshall . |
| 3,750,593 | 8/1973 | Zetterlund ........................ 104/172 |
| 3,897,857 | 8/1975 | Rodaway ........................... 280/242 |
| 4,045,047 | 8/1977 | Buckley ............................. 280/242 |
| 4,410,185 | 10/1983 | Agustin ............................ 280/264 |
| 4,462,605 | 7/1984 | Morgan et al. .................... 280/242 |
| 4,538,825 | 9/1985 | Delahoussaye et al. ........... 280/242 |
| 4,560,033 | 12/1985 | DeWoody et al. ......... 280/289 WC |
| 4,570,756 | 2/1986 | Minnebroker et al. ..... 280/242 WC |

OTHER PUBLICATIONS

Rolls Elite catalog, Invacare Corp., pp. 4 and 37, 1976.
Rolls 500 ATS and 500 STS catalog, Invacare Corp., cover, pp. 2 and 3, 1986.
Rolls Prescription Wheelchairs 900 Series catalog, Invacare Corp., 1986.
Rolls 2000LT catalog, Invacare Corp., 1987.
Rolls 400/Delux 200/DLW 200 and 200 Series Wheelchairs catalog, Invacare Corp., pp. cover, 2, 18, and 26, 1985.

Primary Examiner—Charles A. Marmor
Assistant Examiner—Donn McGiehan
Attorney, Agent, or Firm—Fay, Sharpe, Beall, Fagan, Minnich & McKee

[57] ABSTRACT

A wheel chair (A) has at least one wheel (50) rotatably mounted to a side frame (14). A combined wheel lock and hill holder assembly (D) is mounted adjacent an outermost peripheral surface of a tire (60) mounted to a rim (58) of the wheel. The wheel lock and hill holder assembly has a linkage including a handle member (74) and a brake lever (80) both pivotally connected to the base. A link (84) is pivotally connected in between. Shifting the handle member causes the brake lever to move an axle (90) toward and away from the peripheral surface of the tire. A cam surface (94) having a plurality of projections (102) is rotatably mounted on the axle. In a first mode (FIG. 3), the wheel is free rolling. In a second mode (FIG. 4), the cam surface is moved by the handle into firm friction engagement with the tire peripheral surface to lock the wheel against any rotation. In a third mode (FIG. 5), the cam surface is spring biased into engagement with the wheel such that rotation in one direction is permitted but rotation in the opposite direction causes increasing engagement between the cam and the tire peripheral surface locking the wheel against rotation in that direction.

16 Claims, 3 Drawing Sheets

WHEELCHAIR WITH COMBINED WHEEL LOCK AND HILL HOLDER

BACKGROUND OF THE INVENTION

The present invention relates to vehicles, particularly vehicles for use by the mobility impaired. The invention finds particular application in conjunction with manually or arm powered wheelchairs and will be described with particular reference thereto. However, it is to be appreciated that the present invention may also find application with other wheelchairs and vehicles, such as patient transports, strollers, carts, and the like.

Heretofore, wheelchairs have commonly included wheel locks for locking the large, rear wheels against rotation. A wheel lock assembly was commonly mounted to the frame of the wheelchair adjacent each rear wheel. Each wheel lock assembly included a hand operated lever which was connected by a mechanical linkage to a member for engaging the tread at the periphery of the rear wheel. When the lever was disposed in a free wheeling position, the member was spaced away from the wheel and the tire allowing the wheel to rotate freely. When the handle was moved to a locked position, the member was moved into the tire with sufficient force that it was pressed into and temporarily deformed the outer surface of the tire.

One of the problems with the prior art rear wheel lock was that they required either a relatively large manual effort or a long throw to lock the wheels against rotation. Another problem was that they were unable to provide unidirectional locking of the wheels.

If the operator were to stop propelling the wheelchair up a hill and relax, gravity would urge the chair to roll backwards. Similarly, when the operator removed his hands from the wheels to push a door, the pushing tended to move the wheelchair rearwardly. Note that if a door with an automatic closure spring had sufficient resistance to movement, the operator might have to lock the wheels against rotation to push the door partially open. However, while the operator was releasing the manual brakes, the door would tend to close. To enable the operator to limit movement of the wheels to the forward direction only, hill holder mechanisms are commonly available on wheelchairs.

It has been proposed to add hill holder mechanisms or one way clutches to the hub of the rear wheels. However, these one way clutches were relatively expensive and mechanically complex. Other hill holders have been devised which interact with the tire at the periphery of the wheels. However, such peripheral acting hill holders are separate and independent structures from the wheel lock. Although the separate wheel lock/hill holder provided greater flexibility, it was more mechanically cumbersome, hence, more expensive. Further, it necessitated mounting a second structure on the wheelchair frame contiguous with the wheel periphery.

The present invention provides a combined hill holder and wheel lock assembly which overcomes the above referenced problems and others.

SUMMARY OF THE INVENTION

In accordance with one aspect of the present invention, a combined wheel lock and brake assembly is provided which has three modes of operation. In a first mode, an associated wheel rotates freely. In a second mode, it engages the wheel periphery with sufficient force that wheel rotation is prevented in any direction. In a third mode, it engages the wheel periphery in such a manner that rotation is limited to one direction while the wheel is locked against rotation in the opposite direction.

In accordance with another aspect of the present invention, the combined wheel lock and hill holder assembly includes a cam surface which is movable between at least a first mounting position and a second mounting position. In the first mounting position, a first portion of the cam is movable to engage and lock the wheel periphery against rotation. In a second mounting position, a second portion of the cam surface slides along the wheel when it is rotating in one direction and is cammed into locking frictional engagement with the wheel when it is rotating in the opposite direction.

In accordance with another aspect of the present invention, an optimal lever actuator arrangement is provided for moving the combined wheel lock and hill holder cam or a conventional wheel lock mechanism into the wheel with minimal effort. A wheel engaging lever is pivotally mounted to a base a first distance from a wheel engaging portion. A connecting link is pivotally connected with the wheel engaging lever a second distance from the base pivot. The brake link is pivotally connected to a handle lever. The link pivots are a third distance apart. The handle lever is pivotally connected with the base a fourth distance from the link pivot. The first, second, third, and fourth distances have a ratio of about 1:038:0.57:0.21.

One advantage of the present invention is that it provides both wheel lock and hill holding functions in a single assembly.

Other advantages of the present invention are that it reduces the throw and effort required to lock the wheel and improves thumb clearance.

Another advantage resides in the interrelationship of the wheel lock and hill holder functions. The same handle can control the operation of both and in some instances, switching between the two.

Still further advantages of the present invention will become apparent from the following detailed description.

BRIEF DESCRIPTION OF THE DRAWINGS

The invention may take form in various parts and arrangements of parts or in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
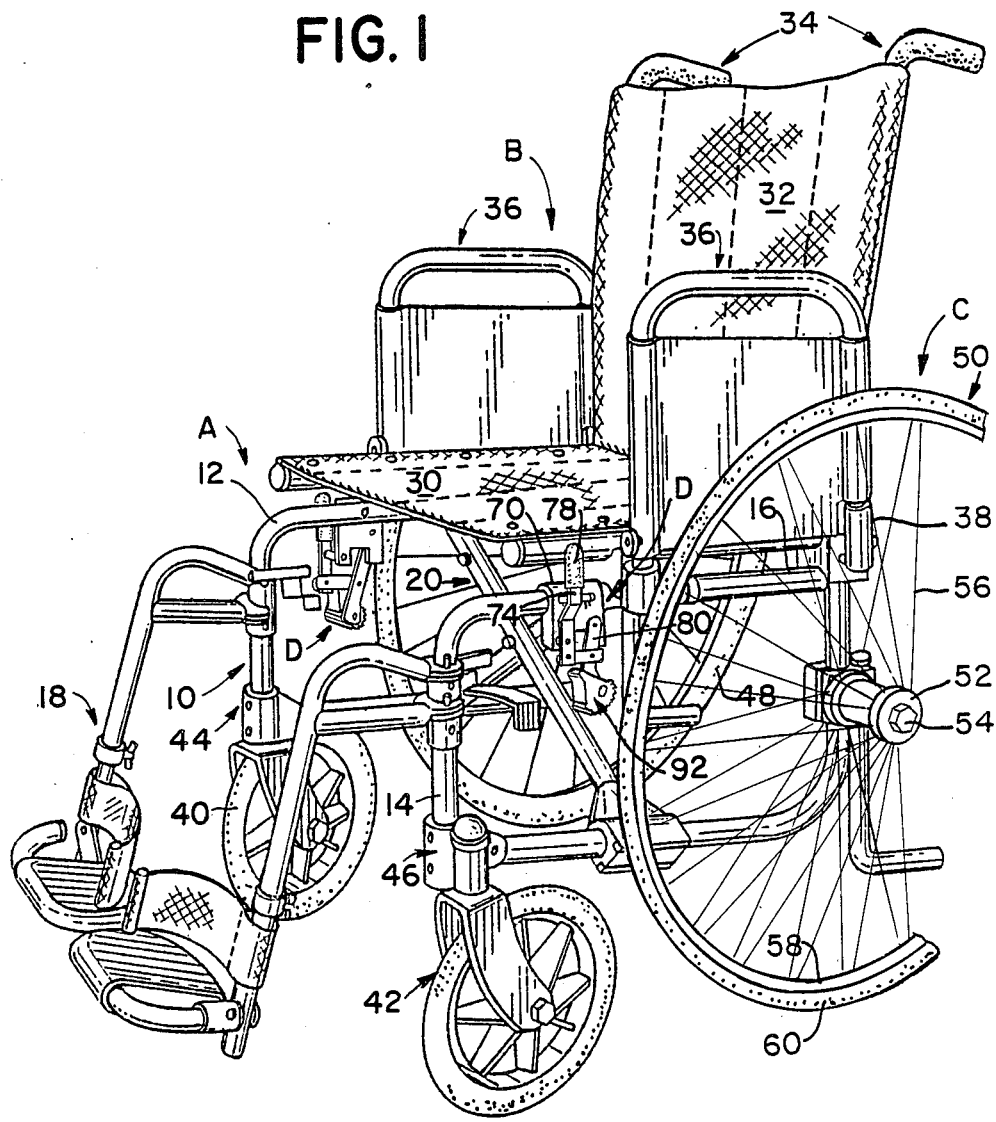
FIG. 1 is a perspective view of a wheel chair in accordance with the present invention.

With reference to FIG. 1, the wheel chair includes a frame assembly A which supports a seat arrangement B. The frame is supported on a plurality of wheels C for rolling locomotion along the ground. A combined wheel lock and hill holder assembly D selectively (1)

allows the wheels to roll freely, (2) locks one or more wheels against rotation, and (3) permits one or more of the wheels to rotate only in one direction.

The frame assembly A includes a right side frame 10 having an upper, horizontal extending member 12. A light side frame portion 14 includes at least one horizontal extending frame portion 16. Foot supporting brackets 18 are mounted to the front of the left and right side frame portions. The left and right side frame portions 10 and 14 are interconnected by appropriate spacing and supporting structures such as a folding arrangement 20.

The seat arrangement B includes a lower seat portion 30 mounted the side frame portions for supporting the patient. A back supporting portion 32 is connected between upward extending members of the left and right side frame extensions which terminate in attendant handles 34. Arm supports 36 are removably mounted to the side frame portions for supporting the operator's arms. A rear pivot 38 permits the arms to be tipped backwards to allow closer approach to a desk or the like.

The plurality of wheels C includes right and left front wheels 40, 42 which are pivotally mounted to the left and right side frame portions by casters 44, 46, respectively. A pair of rear wheels 48, 50 are mounted to the right and left side frame portions, respectively. For simplicity of illustration, the left rear wheel assembly 50 is described in detail, but it is to be appreciated that the description applies equally to the right wheel assembly. The left wheel 50 includes a hub 52 which is rotatably mounted by bearings (not shown) on an axle 54. A plurality of spokes 56 interconnect the hub 52 with an outer rim 58. A tire 60, which may be a pneumatic, solid, or semi-solid tire, is mounted to the rim 58. Commonly, the tire has a tread or road engaging surface on its outermost periphery.

Figure 2:
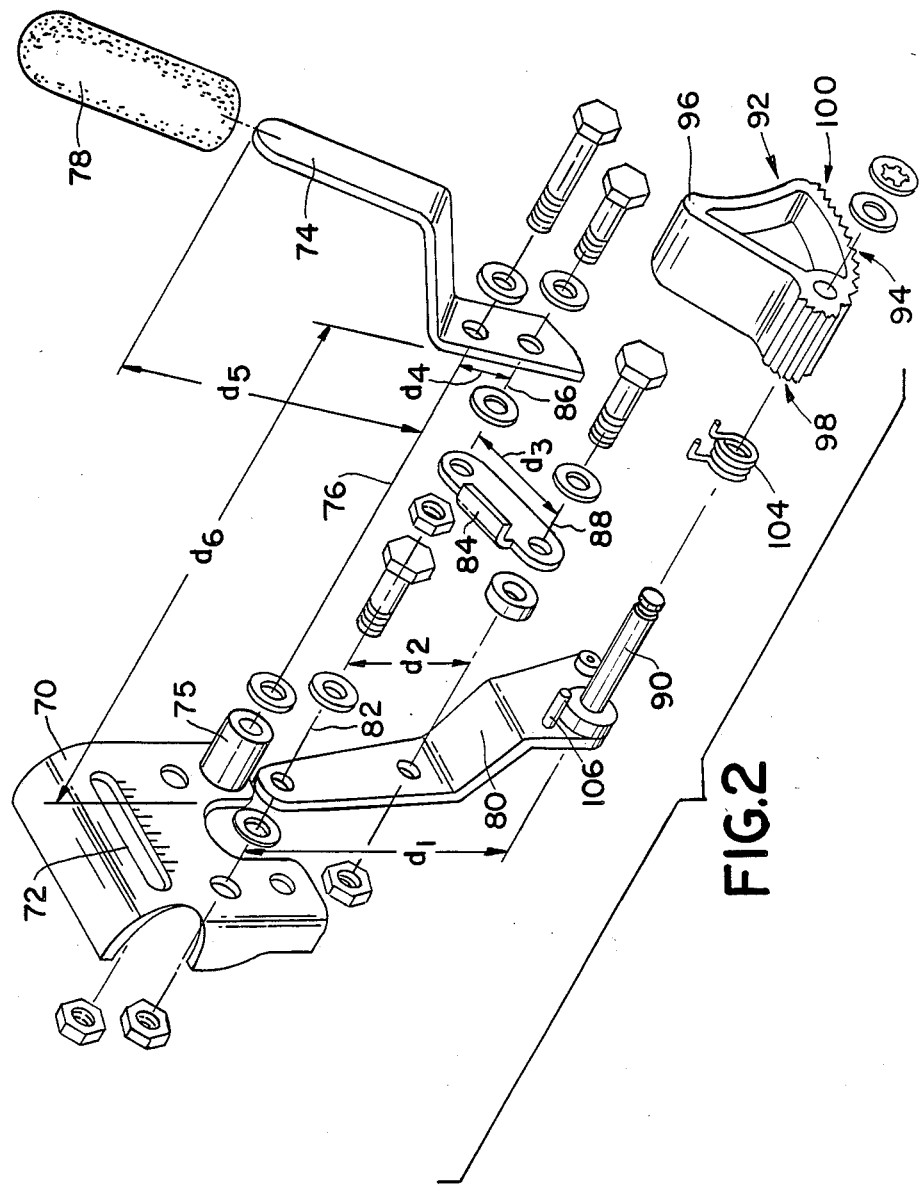
FIG. 2 is an exploded view illustrating the combined wheel lock and hill holder assembly.

With continuing reference to FIG. 1 and particular reference to FIG. 2, the combined wheel lock and hill holders D each include a base or mounting plate 70 which is selectively mounted to one of the side frame horizontal members 12, 16. The base plate 70 includes a transverse slot 72 to enable the forward aft position of the wheel lock/hill holder assembly to be adjusted relative to the periphery of the wheel. A handle lever 74 is mounted to a post 75 extending from the base plate 70 to pivot about a pivot axis 76. A rubber handle 78 facilitates manual grasping and moving of the handle member 74.

A hill holder/wheel lock lever or member 80 is pivotally connected with the base plate 70 for pivotal movement about a pivot axis 82. A brake link 84 is pivotally connected at one end with the handle lever at a pivot axis 86. At its other end, the brake link is connected with the hill holder/wheel lock member 80 for pivotal movement about a pivot axis 88. The hill holder/wheel lock lever 80 has a perpendicular pivotal mounting member or axle 90 disposed a distance $d_1$ from the pivot axis 88. The axle 90 is disposed adjacent and parallel to an outermost peripheral surface of the tire 60.

The hill holder/wheel lock lever axes 82, 88 are spaced a distance $d_2$ and the link axes 86, 88 are separated a distance $d_3$. The pivot axis 76 for mounting the handle member to the base plate is separated by a distance $d_4$ from the pivot axis 86 for mounting the handle member to the brake link 84. The handle extends a distance $d_5$ from the pivot 76. In order to minimize throw and actuation force with adequate shoe to wheel thumb clearance the ratio of $d_1:d_2:d_3:d_4:d_5$ is preferably 1:0.38:0.57:0.21:1.10. However, variations with a tolerance of ±10% may also prove acceptable.

The handle member 74 is off set from the hill holder/wheel lock lever 80 by distance $d_6$ (exaggerated in the exploded view) to provide adequate linkage-to-wheel thumb clearance. That is, the handle member is mounted on the post or offset 75 which extends the distance $d_6$ further from the base plate 70 than the mounting for the hill holder wheel lock lever 80. This enables the handle member 74, the link 84, and the lever 80 to be mounted in a staggered relationship, i.e. the link 84 is mounted to the front of the lever 80 and the back of the handle member 74. The staggered or off set relationship $d_6$ between the handle lever and the hill holder/wheel lock lever is preferably a half inch——about the thickness of a thumb. This provides thumb clearance that would be absent if the hill holder/wheel lock lever were mounted on an analogous post coplanar with the handle member.

A cam member 92 is rotatably mounted on the axle 90 such that different portions of a wheel engaging cam surface 94 can be brought to a wheel engaging position or orientation. The cam member includes a handle or manually graspable portion 96 for facilitating movement of the cam member between different orientations for different modes of operation. The cam surface 94 includes a minor radius or wheel locking surface portion 98 and a major radius or one-way clutch or hill holder wheel engaging surface portion 100. Preferably, ribs or projections 102 are provided for increasing interaction with the wheel or tire tread. A spring 104 biases the hill holder cam surface 100 toward the wheel in the hill holder mode and holds the wheel lock surface portion 98 toward the wheel in a wheel lock mode. A stop 106 limits the cam to rotation between the wheel lock and hill holder positions.

Figure 3:
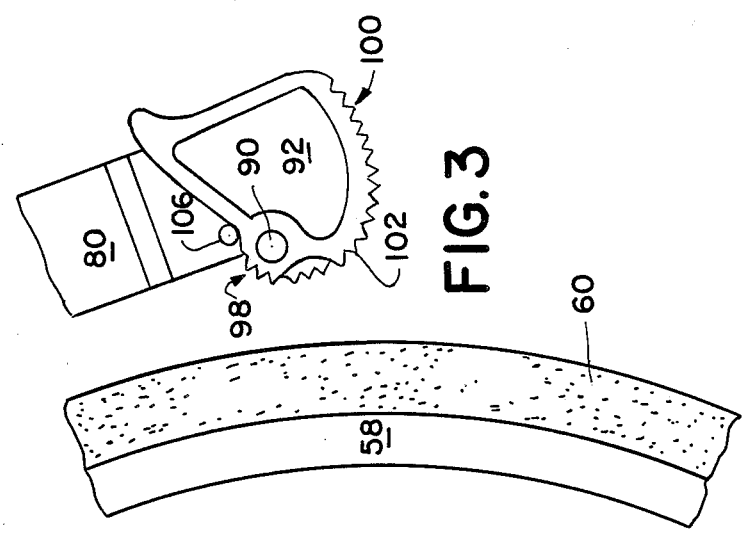
FIG. 3 is a side view of the wheel engaging cam assembly in a free-wheeling or released mode.

The hill holder/wheel lock assembly D has three modes of operation. With reference to FIG. 3, in the first mode of operation, the cam is pivoted against the spring bias into a stable position in which the wheel lock surface 98 is disposed contiguous to but displaced from the surface of the tire 60. A gap, on the order of a centimeter, is defined between the tire periphery and the closest surface of the cam member 92. In this mode, the wheel is permitted to rotate freely with no interaction or interference from the wheel lock and hill holder assembly D.

Figure 4:
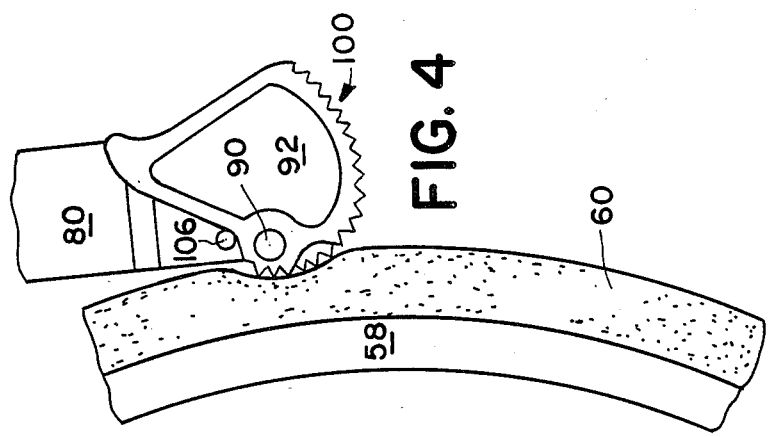
FIG. 4 is a side view of the cam assembly in a lock mode.

By pivoting the handle member 74, the hill holder/wheel lock 80 is caused to pivot from the first mode of FIG. 3 to a second or wheel lock mode of FIG. 4. In the wheel lock mode, the wheel locking surface 98 is caused to travel at least the one centimeter distance to engage the periphery of the tire 60. For a sure, positive lock, the wheel engaging portion 98 moves beyond the outermost surface of the wheel, compressing its resilient rubber surface. The greater the compression, the greater the locking. In the wheel lock mode, the link 84 is preferably at an angle of about 16° short of perpendicular to the hill holder wheel lock lever.

Figure 5:
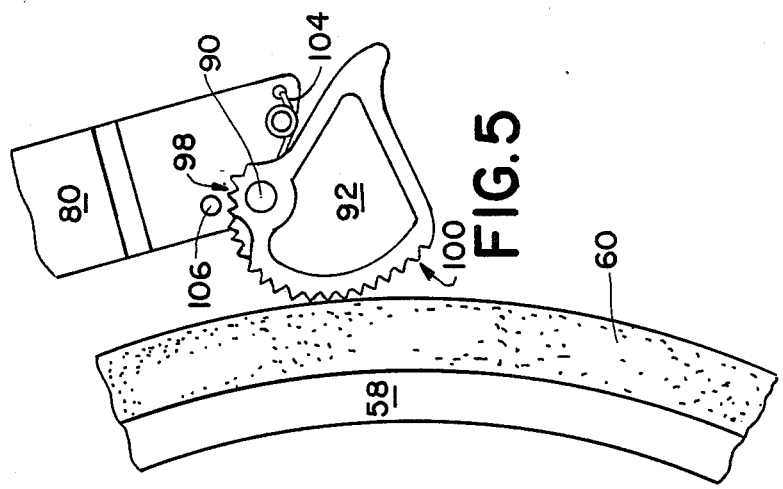
FIG. 5 is a side view of the cam assembly in a hill holding mode.

With reference to FIG. 5, the wheel lock and hill holder assembly D has a third mode of operation in which the wheel is only permitted to travel in one direction-clockwise in the embodiment illustrated in FIG. 5. In the third or hill holder mode, the spring 104 biases the serrated hill lock surface 100 against the wheel. The cam radius increases progressively from the locking surface 9B toward the opposite end. As the wheel rotates clockwise, engagement between the serrations and the tire tends to cause the cam to rotate counter clockwise bringing shorter radius portions of the cam toward the wheel, i.e., reducing the frictional drag or engagement. In this manner, the wheel is freely permitted to rotate clockwise. However, when the wheel rotates counter clockwise, the interengagement with the serrations bring progressively longer radius portions of the cam surface into engagement with the wheel. This wedges the cam surface and the outer periphery of the tire progressively more firmly together locking the wheel against counter clockwise rotation. However, when the wheel is again rotated clockwise, the cam surface undergoes sufficient counter clockwise rotation that the wheel may again rotate freely in that direction.

Although the cam surface can be moved between its hill holder and wheel lock positions by handle portion 96, this change can also be accomplished with handle 78. When the cam is in the hill holder position of FIG. 5 and the wheel chair is moving forward, moving the handle 78 to the locking position moves the axle 98 closer to the wheel. This causes greater frictional engagement of the cam surface 94 and the wheel causing the cam surface to rotate counter clockwise until the cam surface is rotated all the way to the stop position of FIGS. 3 and 4. Further continued movement of the handle to the brake position or wheel lock position brings the assembly fully to the wheel locking position of FIG. 4. Upon releasing the handle and wheel lock, the cam will be in the free wheeling position of FIG. 3. Analogously, when the assembly is in the free wheeling mode of FIG. 3 and the wheel chair starts to roll backwards (the wheel starts to rotate counter clockwise), the handle 78 may be utilized to bring the cam surface 98 momentarily into contact with the wheel periphery and then released. The momentary contact causes sufficient frictional interaction between the wheel or tire outer periphery and the cam member is rotated counter clockwise to the hill holder mode of FIG. 5. The wheel is quickly locked against rearward or counter clockwise rotation but is free to move forward or clockwise.

The expanding radius curvature of the cam surface 94 is preferably gauged so that the axle 90 has constant loading regardless of which portion of the cam that engages the wheel. This renders the loading strength requirements of the axle constant regardless of the exact adjustment or spacing between the assembly and the wheel.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment the invention is now claimed to be:

1. A wheel chair comprising:
  a frame assembly;
  a seat means for supporting an operator, the seat means being supported by the frame assembly;
  a plurality of wheels connected with the frame assembly for rollably supporting the frame assembly;
  a combined wheel lock and hill holder assembly mounted to the frame assembly adjacent a periphery of a first of the wheels which has:
    a first mode in which the first wheel is free wheeling,
    a second mode in which the wheel lock and brack assembly engages the first wheel periphery and prevents rotation of the first wheel in both first and second directions, and
    a third mode in which the wheel lock and brake assembly engages the first wheel periphery and limits rotation of the first wheel to the first direction such that the first wheel rotates in the first direction and is locked against rotation in the second direction, wherein the combined wheel lock and hill holder assembly includes:
  a cam member with a surface having progressively increasing radii therealong from a minor radius adjacent one end through an intermediate radius portion to a major radius portion in the second mode, and engages the first wheel periphery adjacent the intermediate radius portion in the third mode.

2. The wheel chair as set forth in claim 1 wherein combined wheel lock and hill holder assembly further includes:
  a wheel lock and brake member having an axle extending therefrom generally parallel to a peripheral surface of the first wheel, the member being mounted for movement between a displaced position in which the axle is more distant from the first wheel periphery and a second position in which the axle is displaced more closely to the first wheel periphery, wherein said cam member is rotatably mounted on the axle;
  a spring means for fiasing the cam member major radius end toward the first wheel periphery; and,
  means for mounting the cam member with the minor radius end toward the first wheel periphery.

3. The wheel chair as set forth in claim 2 wherein said means for moving the cam member includes a mechanical linkage for moving the axle between the first and second positions.

4. The wheel chair as set forth in claim 3 wherein the mechanical linkage includes a base to which the wheel lock and hill holder member is pivotally mounted, a handle member pivotally mounted to the base, and a brake link member pivotally connected to the handle member and the wheel lock and brake assembly member.

5. The wheel chair as set forth in claim 4 wherein a distance from the pivotal connection between the wheel lock and hill holder member and the base to the axle, a distance from the pivot connection between the wheel lock and the hill holder member and the base to the pivotal connection between the wheel lock and hill holder member and the link, a distance between the link pivotal connections and a distance from the pivotal connection between the handle member and the base to the pivotal connection between the handle member and the link are generally in a ratio of 1:0.38:0.57:0.21.

6. The wheel chair as set forth in claim 4 wherein the cam surface has a plurality of projections for improving frictional inter-engagement with the first wheel periphery.

7. A wheel brake assembly for wheel chairs comprising:
  a base configured for mounting to a wheel chair side frame member;
  a brake lever pivotally connected with the base at a first pivot point and having a wheel engaging portion adjacent an opposite end, wherein the wheel engaging portion includes a cam member having a progressively increasing radius from a minor radius portion, through intermediate radius portions, to a major radius portion;

a handle member pivotally connected with the base at a second pivot point;

a connecting link pivotally connected with the brake lever at a third pivot point and pivotally connected with the handle member at a fourth pivot point;

distances between the first pivot point and the wheel engaging portion, the first and third pivot points, the third and fourth pivot points, and the second and fourth pivot points having a ratio of generally 1:0.4:0.6:0.2.

8. The assembly as set forth in claim 7 wherein the connecting link further includes a stop means for limiting rotational movement of the handle member.

9. The assembly as set forth in claim 7 wherein the cam member is rotatably mounted on an axle extending from the brake lever such that the cam member can assume a first position in which the minor radius is stably disposed toward a wheel peripheral surface and a second position in which one of the intermediate radius portions is disposed toward the wheel peripheral surface.

10. The assembly as set forth in claim 9 further including a spring means for biasing the intermediate radius cam portion toward the wheel peripheral surface in the second position.

11. The assembly as set forth in claim 10 wherein the cam member has a plurality of projections extending outward therefrom for engaging the wheel peripheral surface more securely.

12. A combined wheel lock and hill holder assembly comprising:

a base which is selectively mountable to a wheel chair;

a linkage assembly for selectively moving a cam surface between positions of greater and letter proximity to a peripheral surface of a wheel; and, the cam surface being positionable in at least three modes, a first mode in which the wheel is free to rotate in either a first or second direction, a second mode in which the cam surface firmly engages the wheel periphery and prevents rotation in both the first and second directions, and a third mode in which the cam surface engages the wheel periphery to permit rotation in the first direction and to block rotation in the second direction, wherein the cam surface is rotatably mounted on an axle extending from the linkage, the cam surface having a minor radius portion adjacent its rotational mounting with the axle, a major radius portion disposed further from the axle, and an intermediate radius portion disposed therebetween.

13. The assembly as set forth in claim 12 further including a spring means for biasing the cam surface major radius portion towards the wheel periphery.

14. The assembly as set forth in claim 13 further including projections extending from the cam surface for engaging the wheel periphery more securely.

15. The assembly as set forth in claim 13 wherein the linkage assembly further includes:

a brake lever extending a first distance from a brake lever pivotal connection with a base to the axle;

a connecting link pivotally mounted to the brake lever a second distance from the brake lever pivotal connection with the base;

a handle member pivotally connected with the base, the connecting link being pivotally connected to the handle member a third distance from the link's pivotal connection with the brake lever and a fourth distance from the handle member's pivotal connection with the base;

the first, second, third, and fourth distances having a ratio of about 1:04:0.6:0.2.

16. A wheel chair comprising:

a frame assembly;

a seat means for supporting an operator, the seat means being supported by the frame assembly;

a plurality of wheels connected with the frame assembly for rollably supporting the frame assembly;

a brake assembly mounted to the frame assembly adjacent a periphery of a first of the wheels which has:

a base configured for mounting to the wheel frame assembly;

a brake lever pivotally connected with the base at a first pivot point and having a wheel engaging portion adjacent an opposite end, wherein the wheel engaging portion includes a cam member that is rotatably mounted on an axle extending from the brake lever and having a cam surface with a progressively increasing radius from a minor radius portion, through intermediate radius portion, to a major radius portion;

a handle member pivotally connected with the base at a second pivot point;

a spacer member disposed between the handle member and the base for displacing the handle member further from the base brake lever by at least the thickness of an operator's thumb;

a connecting link pivotally connected with the brake lever at a third pivot point and pivotally connected with the handle member at a fourth pivot point.

* * * * *